Dec. 30, 1969     P. F. ROSSMANN     3,487,442
FLEXIBLE THREAD SYSTEMS FOR HIGH PRESSURE VESSELS AND THE LIKE
Filed March 4, 1968
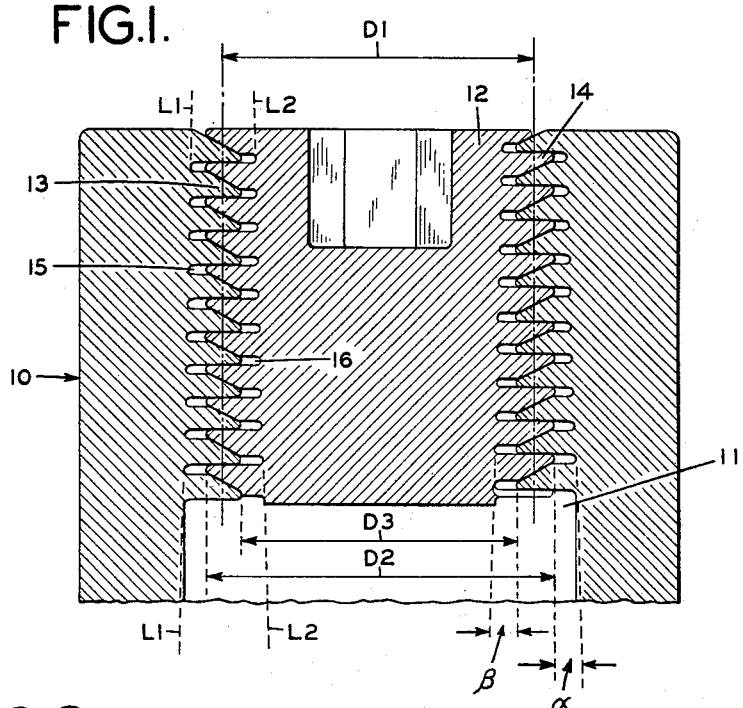
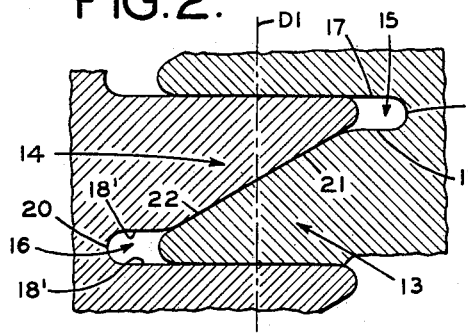
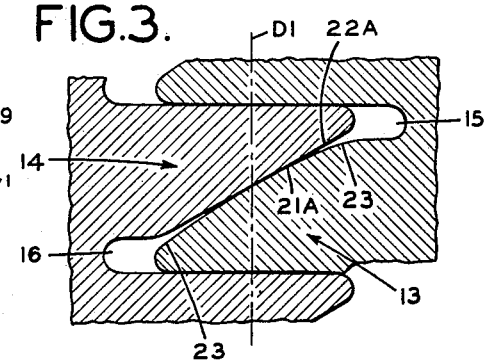
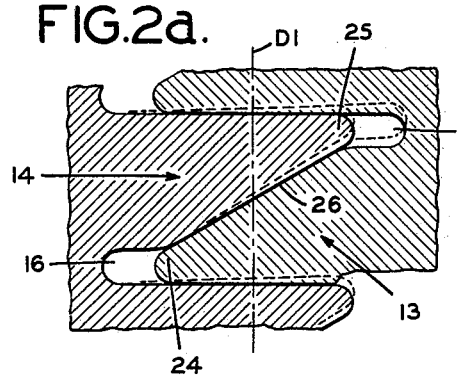
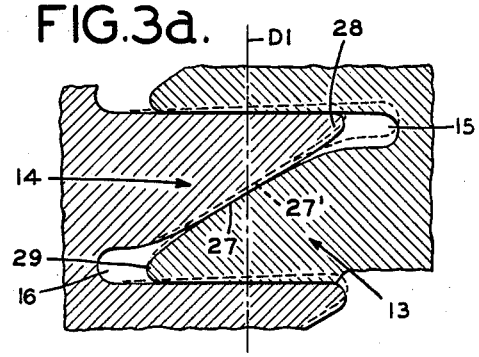

United States Patent Office 3,487,442
Patented Dec. 30, 1969

3,487,442
FLEXIBLE THREAD SYSTEMS FOR HIGH PRESSURE VESSELS AND THE LIKE
Peter F. Rossmann, Grosse Pointe Farms, Mich., assignor to National Forge Company, Irvine, Pa., a corporation of Delaware
Filed Mar. 4, 1968, Ser. No. 710,205
Int. Cl. B65d 39/08; F16b 33/04
U.S. Cl. 220—39
12 Claims

ABSTRACT OF THE DISCLOSURE

A flexible thread system for use on screw type closure structures for high pressure vessels and the like wherein a gullet, preferably tapered, is provided below the normal root portion of one, or both, of the mating male and female threads of the screw type closure, the gullet or gullets enabling the thread cross section to deflect as a lever in order to enable the closure threads to be uniformly stressed and to accommodate the pressurized stress patterns of the vessel system.

Background of the invention

This invention relates to an improvement in closure means of the threaded type for metallic vessels utilized for high pressure applications and more particularly to an improved thread system which has an inherent flexible characteristic.

In certain high pressure applications, such as for example, those involving isostatic vessels which are provided with closure means of the threaded type, it is desirable that the closure threads be uniformly stressed or that they accommodate the pressurized stress patterns of the vessel system.

In pressure vessel systems using threaded closures, which are the simplest and preferred constructions, the highest axial stresses are imposed on the threads nearest the internal pressure in the vessel, with the stresses gradually, but not necessarily uniformly, decreasing in the threads outward from the inner portion of the closure. There are also radial stresses in the pressure vessel or nut element which further distort and/or increase the stresses in the threads. Accordingly, the closure constructions in high pressure vessels have necessarily been required to have over-designed cross sections in order to provide adequate safety factors, since not all of the closure threads are equally and efficiently stressed to their load carrying capacity.

The invention may be applied to isostatic pressure vessels or to pressure vessels of other types, or to pressure vessel systems which require parallel or helical screw threads in the closure constructions. The closure elements may be either of the continuous thread-screw and nut type, or have interrupted parallel or helical threads such as are in common use for the breeches of artillery guns. In all such cases, a true thread profile adapted to the particular application may be used.

The principal object of the invention has been the provision of a novel and improved thread system.

More particularly, it has been an object of the invention to provide a thread system for use with pressure vessel closures and in which the closure threads are either uniformly stressed or otherwise accommodate the pressurized stress patterns of the vessel system.

Another object of the invention has been the provision of a thread system having a flexibility characteristic which enables the thread cross section to deflect as a lever.

Still another object of the invention has been the provision of such a thread system in which the complex stresses in a pressure vessel closure system can be accommodated without the necessity for over-design in cross section strength and without the necessity for interposing an independent stress-absorbing element between the threads.

Other and further objects, features and advantages of the invention will be apparent from the following description of the invention.

Summary of the invention

In accordance with the invention, there is provided a thread system for use on screw type closure structures for high pressure vessels and the like wherein threaded male and female members are in threaded engagement. Typically a threaded type plug closure member is screwed into a complementary threaded opening into a pressure vessel. The thread system involves the provision of a gullet or groove below the normal root portion of the male thread, the female thread or both such threads. The gullet or groove, which is preferably tapered, establishes a flexibility characteristic enabling the thread cross section to deflect as a lever in order to enable the closure threads to be stressed uniformly or to accommodate pressurized stress patterns of the vessel system. The gullet depth, or depths in the preferred case of a tapered gullet, is preferably selected so that all portions of the threads are deflected by amounts which result in substantially uniform unit stresses in the metal. The term tapered is intended to mean axially profiled. The profile need not be straight.

Brief description of the drawings

The invention will now be described in greater detail with reference to the appended drawings in which:

FIG. 1 is a view in central vertical section of the closure area of a high pressure vessel;

FIG. 2 shows a portion of the threaded closure of FIG. 1 drawn to an enlarged scale for purposes of clarity;

FIG. 2a is a view similar to FIG. 2 but illustrating in dashed lines and to an exaggerated extent, thread deflections;

FIG. 3 is a view similar to FIG. 2 but showing a modified construction for the gullets associated with the threads; and FIG. 3a is a view similar to FIG. 3, but illustrating a further modified construction and also, in dashed lines and to an exaggerated extent, thread deflections.

With reference now to FIGS. 1 and 2 in particular, the high pressure vessel 10 may have any configuration and only the portion thereof provided with a threaded opening 11 into which a threaded plug 12 is screwed to close off the interior of the vessel has been illustrated. The female thread provided in the opening 11 is designated 13 while the male thread provided on the closure 12 is designated 14.

Buttress type threads are illustrated for the screw type closure but the improved thread construction is not limited to this particular type of thread, as has been previously indicated.

The pitch diameter of the thread system is indicated by the dimension line D1. The normal root diameter of the female thread 13 is represented by dimension line D2, and the root diameter of the male thread 14 is represented by dimension line D3. Associated with the normal root portion of the female thread 13 is a helical groove or gullet 15, and similarly associated with the root portion of the male thread 14 is a helical groove or gullet 16.

The depth of the helical gullet 15 is not uniform throughout the axial length of female thread 13 but rather progressively increases in the direction of the end of the thread nearest the interior of the vessel 10. Thus, as seen in the diametral section of FIG. 1, the root of gullet 15 has a taper represented by line L1—L1.

Similarly, the depth of helical gullet 16 is not uniform throughout the axial length of thread 14 but rather it also progressively increases in the direction of the end of the thread nearest the interior of vessel 10. Thus, as seen in FIG. 1, the root of gullet 16 has a taper represented by line L2—L2.

The effect of the gullets is to reduced the stiffness of the surrounding metal bodies and hence facilitate bending of the metal under stress. Thus the provision of the gullet at the base of the female thread permits the female thread wall to bend as required to accommodate the force exerted on it by the mating male thread, and vice versa. The depth of the gullets and the extent and direction of the taper which changes this depth from point to point should be selected so that all portions of the threads are deflected by amounts which result in substantially uniform unit stresses in the metal.

It is to be noted that while a tapered helical gullet is associated with the thread on the closure plug as well as with the thread on the opening into the vessel, the principles underlying the inventive concept still obtain when the tapered gullet is applied to only the thread on the plug or to only the thread in the vessel opening. Moreover, the respective angles $\alpha$ and $\beta$ of the gullet tapers may be diverging, or converging, or the gullets may have variable tapers, or be combined with straight zones in relation to the pressure induced stresses encountered in the vessel system. While the tapered gullet construction is preferred, a non-tapered construction can be used.

In accordance with the inventive concept, uniform stressing of the closure threads is achieved in that the thread cross section deflects as a lever in the axial direction and the gullets 15 and/or 16 facilitate the necessary deflection properties.

With reference now to the enlargement depicted in FIG. 2, the flanks 17 and 17' of gullet 15 are seen to be parallel to each other but this is not essential since they may also be inclined. Similarly, the flanks 18 and 18' of gullet 16 while shown parallel may also be inclined. The radii or curves of the surfaces 19, 20 at the roots of gullets 15, 16, and of the surfaces 21, 22 at the roots of the threads 13, 14 respectively are preferably such as to equalize distribution of stress in the vessel system so that the threads function as uniformly stressed continuous flexible levers. The flank portions of the threads are seen to be straight.

FIG. 2a illustrates a conventional buttress thread engagement in which the dashed lines represent deflections. The amounts of the deflections are exaggerated for purposes of illustration. D1 is the thread pitch line, and 26 shows the parallel mating surfaces in the unstressed condition. This parallelism is the expected ideal, but it is doubtful if this is fully achieved in actual practice under load. Certainly in the loaded or stressed condition, parallelism is to some extent lost, and the thread tips 24 and 25 could become the loading points, introducing complex bending and sheer stresses that are not well understood.

To centralize the stresses along the pitch line and to equalize the lever arms, a crowned thread construction may be used, as shown in FIG. 3.

In the modification illustrated in FIG. 3, it will be seen that the flanks 21A of thread 13 are not straight, as in FIG. 2, but rather the flank 21A of thread 13 is crowned at both the tip and root ends as indicated at 23 to assist in accommodating the bending stresses. If desired, similar crowning may be applied to the flanks of thread 14, as shown in FIG. 3a, or the crowning may be applied to thread 14 rather than to thread 13.

FIG. 3a illustrates a crowned buttress thread engagement which confines the loading to the rocking or osculating surfaces 27. It should be noted that thread tips 28 and 29 are unloaded which makes for a consistently short lever arm. Crowning permits great latitude in the manufacturing operations, since parallel thread surfaces are unnecessary. The dashed line positions of the threads in FIG. 3a represent, in an exaggerated way, the deflections to be expected under load conditions. Engagement of the threads under load is shown by the deflected surfaces, designated 27'.

What is claimed is:

1. In a thread system for use on screw type closure structures for high pressure vessels and the like wherein a male threaded member and a female threaded member are screwed into a complementary threaded engagement, the improvement wherein a gullet is provided below the normal root portion of at least one of the two mating threads, said gullet establishing a flexibility characteristic enabling the thread cross section to deflect as a lever, in order to enable said closure threads to be uniformly stressed and to accommodate pressurized stress patterns of the vessel system, the flank of at least one of said mating threads being crowned.

2. A thread system as set forth in claim 1 in which the depth of said gullet is selected so that all portions of said threads are deflected by amounts which result in substantially uniform unit stresses in the walls of said members adjacent said threads.

3. A thread system as set forth in claim 2 in which said gullet is tapered to provide a gradually increasing depth in the direction of the greatest stress on said threads when said members are under load.

4. A thread system as set forth in claim 2 in which corresponding ones of said gullets are provided in both of said mating threads.

5. A thread system as set forth in claim 4 in which both of said gullets are tapered to provide a gradually increasing depth in the direction of the greatest stress on said threads when said members are under load.

6. A thread system as set forth in claim 2 in which the flank of at least one of said mating threads is crowned.

7. In a thread system for use on screw type closure structures for high pressure vessels and the like wherein a threaded type plug closure member is screwed into a complementary threaded opening into the vessel, the improvement wherein a tapered gullet is provided below the normal root portion of at least one of the two mating threads, said gullet establishing a flexibility characteristic enabling the thread cross section to deflect as a lever in order to enable said closure threads to be uniformly stressed and to accommodate pressurized stress patterns of the vessel system, the flank of at least one of the two mating threads being crowned.

8. A flexible thread system as defined in claim 7 wherein the depth of said gullet increases in the direction of the end of the thread nearest the interior of the vessel.

9. A flexible thread system as defined in claim 7 wherein a gullet is provided for each of said threads.

10. A flexible thread system as defined in claim 7 wherein the depth of each gullet increases in the direction of the end of the thread nearest the interior of the vessel.

11. A flexible thread system as defined in claim 3 wherein crowns are provided at both the tip and root ends of said one mating thread.

12. A flexible thread system as defined in claim 3 wherein the flanks of both of said mating threads are crowned.

References Cited

UNITED STATES PATENTS

| | | | |
|---|---|---|---|
| 2,263,644 | 11/1941 | Pierce | 220—39 |
| 2,930,409 | 3/1960 | Higgins | 220—39 |

JAMES B. MARBERT, Primary Examiner

U.S. Cl. X.R.

85—1, 32, 46

UNITED STATES PATENT OFFICE
CERTIFICATE OF CORRECTION

Patent No. 3,487,442　　　　　　　　　　　　December 30, 1969

Peter F. Rossmann

It is certified that error appears in the above identified patent and that said Letters Patent are hereby corrected as shown below:

Column 3, line 6, "reduced" should read -- reduce --. Column 4, all the matter beginning with line 35 and including line 37 should be cancelled; same column 4, the claims should be renumbered from 7 through 12 to 6 through 11, respectively lines 58 and 62, "claim 3", each occurrence, should read -- claim 7 --. In the heading to the printed specification, lin "12 Claims" should read -- 11 Claims --.

Signed and sealed this 7th day of July 1970.

(SEAL)
Attest:

Edward M. Fletcher, Jr.　　　　　　　　　　WILLIAM E. SCHUYLER, JR
Attesting Officer　　　　　　　　　　　　　　　Commissioner of Patents